US012749718B2

(12) United States Patent
Matsubara et al.

(10) Patent No.: US 12,749,718 B2
(45) Date of Patent: Sep. 29, 2026

(54) NEGATIVE ELECTRODE ACTIVE MATERIAL FOR AQUEOUS SECONDARY BATTERIES, NEGATIVE ELECTRODE FOR AQUEOUS SECONDARY BATTERIES, AND AQUEOUS SECONDARY BATTERY

(71) Applicant: Panasonic Intellectual Property Management Co., Ltd., Osaka (JP)

(72) Inventors: Kenji Matsubara, Osaka (JP); Masanobu Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 784 days.

(21) Appl. No.: 17/796,229

(22) PCT Filed: Dec. 1, 2020

(86) PCT No.: PCT/JP2020/044694

§ 371 (c)(1),
(2) Date: Jul. 28, 2022

(87) PCT Pub. No.: WO2021/152999

PCT Pub. Date: Aug. 5, 2021

(65) Prior Publication Data

US 2023/0077974 A1 Mar. 16, 2023

(30) Foreign Application Priority Data

Jan. 30, 2020 (JP) ................................ 2020-013395

(51) Int. Cl.

| | |
|---|---|
| ***H01M 10/26*** | (2006.01) |
| ***H01M 4/02*** | (2006.01) |
| ***H01M 4/583*** | (2010.01) |

(52) U.S. Cl.

CPC ........... *H01M 10/26* (2013.01); *H01M 4/583* (2013.01); *H01M 2004/021* (2013.01); *H01M 2004/027* (2013.01); *H01M 2300/0014* (2013.01)

(58) Field of Classification Search

CPC ................ H01M 10/26; H01M 4/583; H01M 2004/021; H01M 2004/027; H01M 2300/0014; Y02E 60/10; C01B 32/02

See application file for complete search history.

(56) References Cited

U.S. PATENT DOCUMENTS 5,712,062 A * 1/1998 Yamana ................ C04B 41/009 252/502
2017/0352920 A1* 12/2017 Kawai .............. H01M 10/0569

(Continued)

FOREIGN PATENT DOCUMENTS

CN 103043641 A 4/2013
DE 102018114146 A1 * 12/2019 ........... H01M 10/36

(Continued)

OTHER PUBLICATIONS

Translation DE102018114146A1 (Year: 2019).*

(Continued)

*Primary Examiner* — Matthew T Martin
*Assistant Examiner* — Kevin Song
(74) *Attorney, Agent, or Firm* — WHDA, LLP

(57) ABSTRACT

A negative electrode active material for aqueous secondary batteries, said negative electrode active material being applied to an aqueous secondary battery that uses an aqueous electrolyte solution containing water and a lithium salt, wherein: the negative electrode active material contains graphite; the graphite has a C—F bond group on the surface; if $I_{688\ eV}$ is the peak intensity at around 688 eV ascribed to a C—F bond and $I_{284\ eV}$ is the peak intensity at around 284

(Continued)

eV ascribed to a C—C bond in the XPS spectrum of the graphite as obtained by X-ray photoelectron spectroscopy, the ratio of the peak intensity $I_{688\ eV}$ to the peak intensity $I_{284\ eV}$ (namely, the value of $I_{688\ eV}/I_{284\ eV}$) is from 0.1 to 7; and the BET specific surface area is from 0.5 $m^2/g$ to 3.9 $m^2/g$.

13 Claims, 1 Drawing Sheet

(56) References Cited

U.S. PATENT DOCUMENTS

| | | | |
|---|---|---|---|
| 2017/0373351 A1 | 12/2017 | Kawai et al. | |
| 2018/0123171 A1 | 5/2018 | Takechi et al. | |
| 2019/0044190 A1 | 2/2019 | Yamada et al. | |
| 2019/0088948 A1 | 3/2019 | Tojigamori et al. | |
| 2019/0386338 A1* | 12/2019 | Kawai | H01M 10/0525 |
| 2022/0173434 A1 | 6/2022 | Matsubara et al. | |

FOREIGN PATENT DOCUMENTS

| | | | | |
|---|---|---|---|---|
| JP | 2003-059527 | A | | 2/2003 |
| JP | 2003272624 | A | * | 9/2003 |
| JP | 2005071665 | A | * | 3/2005 |
| JP | 102903921 | A | | 1/2013 |
| JP | 2018-073819 | A | | 5/2018 |
| JP | 6423453 | B2 | | 11/2018 |
| JP | 2019-057359 | A | | 4/2019 |
| WO | 2016/114141 | A1 | | 7/2016 |
| WO | 2017/122597 | A1 | | 7/2017 |
| WO | 2020/195092 | A1 | | 10/2020 |

OTHER PUBLICATIONS

Translation JP2003272624A (Year: 2003).*
Translation JP2005071665A (Year: 2005).*
International Search Report dated Feb. 16, 2021, issued in counterpart International application No. PCT/JP2020/044694, with English translation. (5 pages).
Written Opinion dated Feb. 16, 2021, issued in counterpart International application No. PCT/JP2020/044694. (3 pages).

* cited by examiner

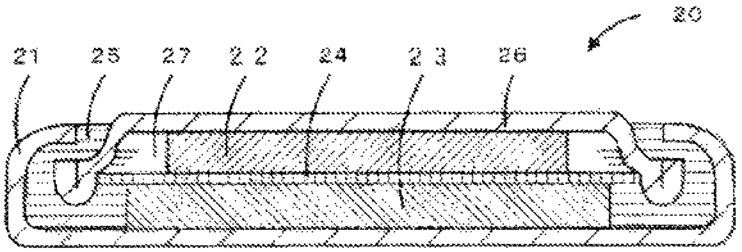
20
21
25
27
22
24
23
26

NEGATIVE ELECTRODE ACTIVE MATERIAL FOR AQUEOUS SECONDARY BATTERIES, NEGATIVE ELECTRODE FOR AQUEOUS SECONDARY BATTERIES, AND AQUEOUS SECONDARY BATTERY

CROSS-REFERENCE TO RELATED APPLICATIONS

This application is a national stage of International Application No. PCT/JP2020/044694, filed Dec. 1, 2020, which claims priority to Japanese Patent Application No. 2020-013395 filed Jan. 30, 2020 both of which are hereby incorporated by reference in their entirety.

TECHNICAL FIELD

The present disclosure relates to a negative electrode active material for an aqueous secondary battery, a negative electrode for an aqueous secondary battery, and an aqueous secondary battery.

BACKGROUND

As secondary batteries with a high output and a high energy density, lithium-ion secondary batteries are widely used that include a positive electrode, a negative electrode, and an electrolyte liquid and perform charge and discharge by allowing lithium ions to travel between the positive electrode and the negative electrode. In the conventional secondary batteries, an organic solvent-based electrolyte liquid is used for achieving the high energy density.

However, organic solvents are generally flammable, and have an important problem of ensuring safety. In addition, organic solvents have a lower ion conductivity than aqueous solutions, and have a problem that the rapid charge-discharge characteristics are insufficient.

In view of such problems, a secondary battery has been studied in which an electrolyte liquid containing water (hereinafter, sometimes referred to as an aqueous electrolyte liquid) is used. For example, Patent Literature 1 and Patent Literature 2 propose a use of an aqueous solution, as an aqueous electrolyte liquid of a secondary battery, containing an alkaline salt at a high concentration. Patent Literature 3 proposes a use of an aqueous electrolyte liquid in which an organic carbonate is added to an aqueous solution containing an alkaline salt at a high concentration. Patent Literature 4 proposes a secondary battery including a negative electrode, a positive electrode, and an aqueous electrolyte liquid, in which the negative electrode includes a composite of a negative electrode active material and polytetrafluoroethylene.

CITATION LIST

Patent Literature

Patent Literature 1: JP 6423453 B
Patent Literature 2: WO 2017/122597 A
Patent Literature 3: JP 2018-73819 A
Patent Literature 4: JP 2019-57359 A

SUMMARY

The conventional aqueous secondary batteries have a problem that the charge-discharge efficiency is so low that only a very low current density resulting from release of Li+ can be obtained.

An aspect of the present disclosure is a negative electrode active material, for an aqueous secondary battery, to be applied to an aqueous secondary battery in which an aqueous electrolyte liquid is used that contains water and a lithium salt. The negative electrode active material includes graphite, and the graphite has a surface having a C—F bond group, and has a ratio of a peak intensity $I_{688\ eV}$ to a peak intensity $I_{284\ eV}$ as an $I_{688\ eV}/I_{284\ eV}$ value of 0.1 or more and 7 or less in an X-ray photoelectron spectroscopy (XPS) spectrum obtained by XPS measurement wherein the peak intensity $I_{688\ eV}$ represents a peak intensity in a vicinity of 688 eV derived from a C—F bond and the peak intensity $I_{284\ eV}$ represents a peak intensity in a vicinity of 284 eV derived from a C—C bond, and the graphite has a BET specific surface area of 0.5 $m^2/g$ or more and 3.9 $m^2/g$ or less.

Furthermore, an aspect of the present disclosure is a negative electrode, for an aqueous secondary battery, including the negative electrode active material for an aqueous secondary battery.

Furthermore, an aspect of the present disclosure is an aqueous secondary battery including the negative electrode for an aqueous secondary battery, a positive electrode, and an aqueous electrolyte liquid containing water and a lithium salt.

According to the present disclosure, the current density (discharge current density) resulting from release of Li+ in the aqueous secondary battery can be improved.

BRIEF DESCRIPTION OF DRAWINGS

FIG. 1 is a schematic sectional view showing an example of an aqueous secondary battery of the present embodiment.

DESCRIPTION OF EMBODIMENTS

In an aqueous secondary battery in which an aqueous electrolyte liquid is used that contains water and a lithium salt, use of a carbon material as a negative electrode active material generally promotes reductive decomposition of the aqueous electrolyte liquid on the carbon material, thus leading to inhibition of progress in a charge reaction of the negative electrode active material. However, as a result of intensive studies, the present inventors have found that the reductive decomposition of the aqueous electrolyte liquid can be suppressed and the charge-discharge reaction of the negative electrode active material can be advanced by using, as a negative electrode active material, graphite having a C—F bond group formed on the surface and by optimizing the absolute amount of the C—F bond group on the graphite surface and optimizing the BET specific surface area of the graphite, and that thus the current density (discharge current density) resulting from release of Li+ in the aqueous secondary battery can be improved. Hereinafter, one aspect of the present disclosure will be described.

A negative electrode active material for an aqueous secondary battery as one aspect of the present disclosure includes graphite, and the graphite has a surface having a C—F bond group, and has a ratio of the peak intensity $I_{688\ eV}$ to the peak intensity $I_{284eV}$ ($I_{688\ eV}/I_{284\ eV}$ value) of 0.1 or more and 7 or less in an X-ray photoelectron spectroscopy (XPS) spectrum obtained by XPS measurement wherein $I_{688\ eV}$ represents the peak intensity in the vicinity of 688 eV derived from a C—F bond, and $I_{284\ eV}$ represents the peak intensity in the vicinity of 284 eV derived from a C—C bond, and the graphite has a BET specific surface area of 0.5 $m^2/g$ or more and 3.9 $m^2/g$ or less. By using the negative electrode active material for an aqueous secondary battery as one aspect of the present disclosure, the current density (discharge current density) resulting from release of Li+ in the secondary battery can be improved. Although the mechanism of exerting the effect is not sufficiently clear, the following is presumed.

The C—F bond group on the graphite surface is a surface-modifying group in which fluorine is bonded to graphite or a functional group present on the graphite surface, and the C—F bond group is formed by subjecting graphite to a fluorine treatment described below. Forming the C—F bond group on the graphite surface can lead to suppression of electrochemical reduction catalytic activity at a defect site (electrochemically active site) on the graphite surface. The suppression results in restraint of the growth rate of the film that is formed on the graphite surface by reductive decomposition of the aqueous electrolyte liquid, leading to improvement in the denseness of the film. In addition, an effect can be expected that water molecules in the aqueous electrolyte liquid are moved away from the graphite surface due to the water repellency of the C—F bond group. However, the C—F bond group on the graphite surface can also be an irreversible site that traps lithium ions, and therefore an excessively large absolute amount of the C—F bond group causes decrease in the amount of lithium released from the negative electrode active material during discharge. Therefore, by setting the absolute amount of the C—F bond group on the graphite surface to an appropriate amount, a dense film can be formed, and a decrease in the release amount of lithium due to an increase in irreversible sites can be suppressed, and thus a charge-discharge reaction of the negative electrode active material can be advanced, and the current density (discharge current density) resulting from release of Li+ in the secondary battery can be improved. Specifically, as described above, if the ratio of the peak intensity $I_{688\ eV}$ to the peak intensity $I_{284\ eV}$ ($I_{688\ eV}/I_{284\ eV}$ value) is 0.1 or more and 7 or less and the BET specific surface area is 0.5 $m^2/g$ or more and 3.9 $m^2/g$ or less, the amount of the C—F bond group present on the graphite surface becomes appropriate from the viewpoint of exhibiting the above effect. Even if the ratio of the peak intensity $I_{688\ eV}$ to the peak intensity $I_{284\ eV}$ ($I_{688\ eV}/I_{284\ eV}$ value) is 0.1 or more and 7 or less, when the BET specific surface area is less than 0.5 $m^2/g$, the absolute amount of the C—F bond group on the graphite surface is so small that a dense film is not formed, and when the BET specific surface area is more than 3.9 $m^2/g$, the absolute amount of the C—F bond group on the graphite surface is so large that the amount of lithium released due to an increase in irreversible sites is decreased. Even if the BET specific surface area is 0.5 $m^2/g$ or more and 3.9 $m^2/g$ or less, when the ratio of the peak intensity $I_{688\ eV}$ to the peak intensity $I_{284\ eV}$ ($I_{688\ eV}/I_{284\ eV}$ value) is less than 0.1, the absolute amount of the C—F bond group on the graphite surface is so small that a dense film is not formed, and when the ratio of the peak intensity $I_{688\ eV}$ to the peak intensity $I_{284\ eV}$ ($I_{688\ eV}/I_{284\ eV}$ value) is more than 7, the absolute amount of the C—F bond group on the graphite surface is so large that the amount of lithium released due to an increase in irreversible sites is decreased.

Hereinafter, an embodiment of the aqueous secondary battery according to the present disclosure will be described in detail.

The shape of the aqueous secondary battery of the present embodiment is not particularly limited, and examples of the shape include coin, button, sheet, stacked, cylindrical, flat, and rectangular shapes. FIG. 1 is a schematic sectional view showing an example of the aqueous secondary battery of the present embodiment. An aqueous secondary battery 20 shown in FIG. 1 includes a cap-shaped battery case 21, a positive electrode 22 provided in the upper part of the battery case 21, a negative electrode 23 provided at a position opposite to the positive electrode 22 with a separator 24 interposed therebetween, a gasket 25 formed with an insulating material, and a sealing plate 26 provided on an opening of the battery case 21 to seal the battery case 21 with the gasket 25. In the aqueous secondary battery 20 shown in FIG. 1, an electrolyte liquid 27 fills a space between the positive electrode 22 and the negative electrode 23. Hereinafter, the electrolyte liquid 27, the positive electrode 22, the negative electrode 23, and the separator 24 will be described in detail.

The electrolyte liquid 27 is an aqueous electrolyte liquid that contains a solvent containing water and contains a lithium salt. The aqueous electrolyte liquid contains water having no flammability, and thus the safety of the aqueous secondary battery 20 can be enhanced. The solvent may be only water, but the content of water in the total amount of the solvent contained in the electrolyte liquid 27 is preferably 10% or more and less than 100%, and more preferably 10% or more and less than 50% in terms of volume ratio.

The amount of water with respect to the lithium salt contained in the electrolyte liquid 27 is such that the molar ratio of the lithium salt to water is preferably 1:4 or less, more preferably in the range of 1:0.4 to 1:4, and still more preferably in the range of 1:0.4 to 1:3. In a case where the amount of water with respect to the lithium salt contained in the electrolyte liquid 27 is within the above range, for example, the potential window of the electrolyte liquid 27 may be enlarged as compared with the case of the water amount out of the above range, and the voltage applied to the aqueous secondary battery 20 may be further increased.

The electrolyte liquid 27 may contain a solvent other than water. Examples of the solvent other than water include organic solvents such as esters, ethers, nitriles, alcohols, ketones, amines, amides, sulfur compounds, and hydrocarbons. Examples of the solvent other than water may further include halogen-substituted solvents in which at least some hydrogens in the above-described solvents are substituted with halogen atoms such as fluorine. Specifically, organic carbonates are preferable from the viewpoint of, for example, improving the battery characteristics of the aqueous secondary battery, and examples of the organic carbonates include cyclic organic carbonates such as ethylene carbonate, propylene carbonate, vinylidene carbonate, and butylene carbonate, chain organic carbonates such as dimethyl carbonate, methyl ethyl carbonate, and diethyl carbonate, and fluorinated organic carbonates including fluorine as a constitution element such as fluoroethylene carbonate, fluorodimethyl carbonate, and methyl fluoropropionate. Among the above examples, the cyclic organic carbonates and the fluorinated organic carbonates including fluorine as a constitution element are particularly preferable from the viewpoint of, for example, suppressing self-discharge of the battery. Among the fluorinated organic carbonates in the above examples, fluoroethylene carbonate is preferable. These organic solvents may be used singly or in combination of two or more kinds thereof.

The amount of the organic carbonate with respect to the lithium salt contained in the electrolyte liquid 27 is such that the molar ratio of the lithium salt to the organic carbonate is preferably in the range of 1:0.01 to 1:5, and more preferably in the range of 1:0.05 to 1:2. In a case where the amount of the organic carbonate with respect to the lithium salt contained in the electrolyte liquid 27 is within the above range, the battery characteristics of the aqueous secondary battery may be improved as compared with the case of the organic carbonate amount out of the above range.

As the lithium salt, any compound can be used as long as it is dissolved and dissociated in the solvent containing water to provide lithium ions in the electrolyte liquid 27. The lithium salt preferably causes no deterioration of the battery characteristics through its reaction with the materials constituting the positive electrode and the negative electrode. Examples of such a lithium salt include salts with an inorganic acid such as perchloric acid, sulfuric acid, or nitric acid, salts with a halide ion such as a chloride ion or a bromide ion, and salts with an organic anion including a carbon atom in its structure.

Examples of the organic anion constituting the lithium salt include anions represented by the following general formulas (i) to (vi).

$$(R^1SO_2)(R^2SO_2)N^- \quad (i)$$

($R^1$ and $R^2$ are each independently selected from an alkyl group or a halogen-substituted alkyl group. $R^1$ and $R^2$ may be bonded to each other to form a ring.)

$$R^3SO_3^- \quad (ii)$$

($R^3$ is selected from an alkyl group or a halogen-substituted alkyl group.)

$$R^4CO_2^- \quad (iii)$$

($R^4$ is selected from an alkyl group or a halogen-substituted alkyl group.)

$$(R^5SO_2)_3C^- \quad (iv)$$

($R^5$ is selected from an alkyl group or a halogen-substituted alkyl group.)

$$[(R^6SO_2)N(SO_2)N(R^7SO_2)]^{2-} \quad (v)$$

($R^6$ and $R^7$ are selected from an alkyl group or a halogen-substituted alkyl group.)

$$[(R^8SO_2)N(CO)N(R^9SO_2)]^{2-} \quad (vi)$$

($R^8$ and $R^9$ are selected from an alkyl group or a halogen-substituted alkyl group.)

In the general formulas (i) to (vi), the number of carbon atoms in the alkyl group or the halogen-substituted alkyl group is preferably 1 to 6, more preferably 1 to 3, and still more preferably 1 to 2. The halogen in the halogen-substituted alkyl group is preferably fluorine. The substitution number of the halogen in the halogen-substituted alkyl group is equal to or smaller than the number of hydrogen atoms in the original alkyl group.

Each of $R^1$ to $R^9$ is, for example, a group represented by the following general formula (vii).

$$C_nH_aF_bCl_cBr_dI_e \quad (vii)$$

(n is an integer of 1 or more, a, b, c, d, and e are integers of 0 or more, and 2n+1=a+b+c+d+e is satisfied.)

Specific examples of the organic anion represented by the general formula (i) include bis(trifluoromethanesulfonyl) imide (TFSI; $[N(CF_3SO_2)_2]^-$), bis(perfluoroethanesulfonyl) imide (BETI; $[N(C_2F_5SO_2)_2]^-$), and (perfluoroethanesulfonyl)(trifluoromethanesulfonyl)imide ($[N(C_2F_5SO_2)(CF_3SO_2)]^-$). Specific examples of the organic anion represented by the general formula (ii) include $CF_3SO_3^-$ and $C_2F_5SO_3^-$. Specific examples of the organic anion represented by the general formula (iii) include $CF_3CO_2^-$ and $C_2F_5CO_2^-$. Specific examples of the organic anion represented by the general formula (iv) include tris(trifluoromethanesulfonyl)carbon acid ($[(CF_3SO_2)_3C]^-$) and tris(perfluoroethanesulfonyl)carbon acid ($[(C_2F_5SO_2)_3C]^-$). Specific examples of the organic anion represented by the general formula (v) include sulfonyl bis(trifluoromethanesulfonyl) imide ($[CF_3SO_2)N(SO_2)N(CF_3SO_2)]^{2-}$), sulfonyl bis(perfluoroethanesulfonyl)imide ($[(C_2F_5SO_2)N(C_2)N(C_2F_5SO_2)]^{2-}$), and sulfonyl (perfluoroethanesulfonyl)(trifluoromethanesulfonyl)imide ($[(C_2F_5SO_2)N(SO_2)N(CF_3SO_2)]^{2-}$). Specific examples of the organic anion represented by the general formula (vi) include carbonyl bis(trifluoromethanesulfonyl)imide ($[(CF_3SO_2)N(CO)N(CF_3SO_2)]^{2-}$), carbonyl bis(perfluoroethanesulfonyl)imide ($[(C2F_5SO_2)N(CO)N(C_2F_5SO_2)]^{2-}$), and carbonyl (perfluoroethanesulfonyl)(trifluoromethanesulfonyl)imide ($[(C_2F_5SO_2)N(CO)N(CF_3SO_2)]^{2-}$).

Examples of organic anions other than the organic anions of the general formulas (i) to (vi) include anions such as bis(1,2-benzenediolate(2-)-O,O)borate, bis(2,3-naphthalenediolate(2-)-O,O)borate, bis(2,2'-biphenyldiolate(2-)-O,O')borate, and bis(5-fluoro-2-olate-1-benzenesulfonate-O,O')borate.

The anion constituting the lithium salt is preferably an imide anion. Specific examples of a preferable imide anion include, in addition to the imide anions exemplified as the organic anions represented by the general formula (i), bis (fluorosulfonyl)imide (FSI; $[N(FSO_2)_2]^-$) and (fluorosulfonyl)(trifluoromethanesulfonyl)imide (FTI; $[N(FSO_2)(CF_3SO_2)]^-$).

The lithium salt having a lithium ion and an imide anion is, for example, preferably lithium bis(trifluoromethanesulfonyl)imide (LiTFSI), lithium bis(perfluoroethanesulfonyl)imide (LiBETI), lithium (perfluoroethanesulfonyl)(trifluoromethanesulfonyl)imide, lithium bis(fluorosulfonyl) imide (LiFSI), or lithium (fluorosulfonyl) (trifluoromethanesulfonyl)imide (LiFTI), and more preferably lithium bis(trifluoromethanesulfonyl)imide (LiTFSI), from the viewpoint of, for example, effectively suppressing self-discharge of the battery. These lithium salts may be used singly or in combination of two or more kinds thereof.

Specific examples of other lithium salts include $CF_3SO_3Li$, $C_2F_5SO_3Li$, $CF_3CO_2Li$, $C_2F_5CO_2Li$, $(CF_3SO_2)_3CLi$, $(C_2F_5SO_2)_3CLi$, $(C_2F_5SO_2)_2(CF_3SO_2)CLi$, $(C_2F_5SO_2)(CF_3SO_2)_2CLi$, $RCF_3SO_2)N(SO_2)N(CF_3SO_2)Li_2$, $[(C_2F_5SO_2)N(SO_2)N(C_2F_5SO_2)]Li_2$, $[(C_2F_5SO_2)N(SO_2)N(CF_3SO_2)]Li_2$, $[(CF_3SO_2)N(CO)N(CF_3SO_2)]Li_2$, $[(C_2F_5SO_2)N(CO)N(C_2F_5SO_2)]Li_2$, $[(C_2F_5SO_2)N(CO)N(CF_3SO_2]Li_2$, lithium bis(1,2-benzenediolate(2-)-O,O')borate, lithium bis(2,3-naphthalenediolate(2-)-O,O')borate, lithium bis(2, 2'-biphenyldiolate(2-)-O,O')borate, lithium bis(5-fluoro-2-olate-1-benzenesulfonate-O,O')borate, lithium perchlorate ($LiClO_4$), lithium chloride (LiCl), lithium bromide (LiBr), lithium hydroxide (LiOH), lithium nitrate ($LiNO_3$), lithium sulfate ($Li_2SO_4$), lithium sulfide ($Li_2S$), and lithium hydroxide (LiOH). These lithium salts may be used singly or in combination of two or more kinds thereof.

The electrolyte liquid 27 preferably contains an additive. The additive is added for improving, for example, battery performance, and any conventionally known additive can be used. The additive is particularly preferably a dicarbonyl group-containing compound from the viewpoint of, for example, forming an electrochemically stable film on the negative electrode by the reduction reaction of the electrolyte liquid 27 to effectively suppress a reductive decomposition reaction of the electrolyte liquid 27.

Examples of the dicarbonyl group-containing compound include succinic acid, glutaric acid, phthalic acid, maleic acid, citraconic acid, glutaconic acid, itaconic acid, and diglycolic acid. The dicarbonyl group-containing compound may be an anhydride, and examples of the anhydride include succinic anhydride, glutaric anhydride, phthalic anhydride, maleic anhydride, citraconic anhydride, glutaconic anhydride, itaconic anhydride, and diglycolic anhydride. Among the above compounds, succinic acid, succinic anhydride, maleic acid, maleic anhydride, diglycolic acid, glutaric acid, and the like are preferable from the viewpoint of forming an electrochemically stable film on the negative electrode to effectively suppress a reductive decomposition reaction of the electrolyte liquid 27. Among them, succinic acid and succinic anhydride are preferable. These compounds may be used singly or in combination of two or more kinds thereof.

The content of the additive is, for example, preferably 0.1 mass % or more and 5.0 mass % or less, and more preferably 0.5 mass % or more and 3.0 mass % or less, based on the total amount of the electrolyte liquid 27. If the content of the additive is set within the above range, the reductive decomposition reaction of the electrolyte liquid 27 may be effectively suppressed as compared with the case of the additive content out of the above range.

The positive electrode 22 includes, for example, a positive electrode current collector and a positive electrode mixture layer formed on the positive electrode current collector. As the positive electrode current collector, for example, a foil of a metal electrochemically and chemically stable within the potential range of the positive electrode or a film having such a metal disposed on its surface layer can be used. The form of the positive electrode current collector is not particularly limited. For example, a porous body of the metal, such as a mesh, a punching sheet, or an expanded metal, may be used. As the material of the positive electrode current collector, for example, a known metal can be used that is usable in a secondary battery in which an aqueous electrolyte liquid is used. Examples of such a metal include stainless steel, Al, an aluminum alloy, and Ti. The positive electrode current collector preferably has a thickness of, for example, 3 μm or more and 50 μm or less from the viewpoints of current collectability, mechanical strength, and the like.

The positive electrode mixture layer includes a positive electrode active material. The positive electrode mixture layer may include a binder, a conductive agent, and the like. The positive electrode 22 can be manufactured by, for example, applying a positive electrode mixture slurry including a positive electrode active material, a binder, a conductive agent, and the like to a positive electrode current collector, and drying and rolling the applied film to form a positive electrode mixture layer on the positive electrode current collector.

Examples of the positive electrode active material include lithium-transition metal oxides containing lithium (Li) and a transition metal element such as cobalt (Co), manganese (Mn), or nickel (Ni). In addition, examples of the positive electrode active material include transition metal sulfides, metal oxides, lithium-containing polyanion-based compounds including one or more transition metals such as lithium iron phosphate ($LiFePO_4$) and lithium iron pyrophosphate ($Li_2FeP_2O_7$), a sulfur-based compound ($Li_2S$), oxygen, and oxygen-containing metal salts such as lithium oxide. The positive electrode active material is preferably a lithium-containing transition metal oxide, and preferably includes at least one of Co, Mn, or Ni as a transition metal element.

The lithium-transition metal oxide may include an additional element other than Co, Mn, and Ni, and for example, may include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium-transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xMn_{2-y}M_yO_4$, $Li_xMn_{2-y}M_yO_4$, $LiMPO_4$, and $Li_2MPO_4F$ (in each chemical formula, M is at least one of Na, Mg, Sc, Y, Mn, Fe, Co, Ni, Cu, Zn, Al, Cr, Pb, Sb, or B, $0<x\leq 1.2$, $0<y\leq 0.9$, and $2.0\leq z\leq 2.3$). The lithium-transition metal oxides may be used singly or in combination of two or more kinds thereof. The lithium-transition metal oxide preferably includes 80 mol % or more of Ni based on the total amount of the transition metals other than lithium from the viewpoint of increasing the capacity. From the viewpoint of stability of the crystal structure, the lithium-transition metal oxide is more preferably $Li_aNi_bCo_cAl_dO_2$ ($0<a\leq 1.2$, $0.8\leq b<1$, $0<c<0.2$, $0<d\leq 0.1$, and $b+c+d=1$).

As the conductive agent, a known conductive agent can be used that enhances the electroconductivity of the positive electrode mixture layer, and examples of the conductive agent include carbon materials such as carbon black, acetylene black, Ketjenblack, graphite, carbon nanofibers, carbon nanotubes, and graphene. As the binder, a known binder can be used that maintains good contact states of the positive electrode active material and the conductive agent and enhances the adhesiveness of the positive electrode active material and the like to the surface of the positive electrode current collector, and examples of the binder include fluororesins such as polytetrafluoroethylene (PTFE) and polyvinylidene fluoride (PVDF), polyacrylonitrile (PAN), polyimides, acrylic resins, polyolefins, carboxymethyl cellulose (CMC) and its salts, styrene-butadiene rubber (SBR), polyethylene oxide (PEO), polyvinyl alcohol (PVA), and polyvinylpyrrolidone (PVP).

The negative electrode 23 includes, for example, a negative electrode current collector and a negative electrode mixture layer formed on the negative electrode current collector. As the negative electrode current collector, for example, a foil of a metal electrochemically and chemically stable within the potential range of the negative electrode or a film having such a metal disposed on its surface layer can be used. The form of the negative electrode current collector is not particularly limited. For example, a porous body of the metal, such as a mesh, a punching sheet, or an expanded metal, may be used. As the material of the negative electrode current collector, for example, a known metal can be used that is usable in an aqueous secondary battery. Examples of such a metal include Al, Ti, Mg, Zn, Pb, Sn, Zr, and In. These metals may be used singly, or may be used as an alloy or the like of two or more kinds thereof, and the material of the negative electrode current collector is to include at least one such metal as a main component. In the case of including two or more elements, the material is not necessarily required to be alloyed. The negative electrode current collector preferably has a thickness of, for example, 3 μm or more and 50 μm or less from the viewpoints of current collectability, mechanical strength, and the like.

The negative electrode mixture layer includes a negative electrode active material. The negative electrode mixture layer may include a binder, a conductive agent, and the like. As the conductive agent and the binder, ones similar to those on the positive electrode side can be used. The negative electrode 23 can be manufactured by, for example, applying a negative electrode mixture slurry including a negative electrode active material, a binder, a conductive agent, and the like to a negative electrode current collector, and drying and rolling the applied film to form a negative electrode mixture layer on the negative electrode current collector.

The negative electrode active material includes graphite having a surface having a C—F bond group. Hereinafter, such graphite is sometimes referred to as surface-modified graphite. From the viewpoint of improving the current density (discharge current density) resulting from release of Li+ in the aqueous secondary battery, the surface-modified graphite is to have a ratio of the peak intensity $I_{688\ eV}$ to the peak intensity $I_{284eV}$ (hereinafter, referred to as peak intensity $I_{688\ eV}$/peak intensity $I_{284\ eV}$ value) of 0.1 or more and 7 or less in an XPS spectrum obtained by X-ray photoelectron spectroscopy measurement wherein $I_{688\ eV}$ represents the peak intensity in the vicinity of 688 eV (for example, in the range of 686.5 eV to 689.5 eV) derived from a C—F bond, and $I_{284eV}$ represents the peak intensity in the vicinity of 284 eV (for example, in the range of 282.5 eV to 285.5 eV) derived from a C—C bond, and the peak intensity $I_{688\ eV}$/peak intensity $I_{284\ eV}$ value is preferably 0.5 or more and 4 or less and more preferably 1.2 or more and 3 or less. The surface-modified graphite is to have a BET specific surface area of 0.5 $m^2/g$ or more and 3.9 $m^2/g$ or less from the viewpoint of improving the current density resulting from release of Li+ in the aqueous secondary battery, and the BET specific surface area is preferably 1 $m^2/g$ or more and 2 $m^2/g$ or less and more preferably 1.2 $m^2/g$ or more and 1.8 $m^2/g$ or less.

The peak intensity $I_{688\ eV}$ and the peak intensity $I_{284\ eV}$ in the XPS spectrum measured by X-ray photoelectron spectroscopy are obtained under the following conditions.

Measurement device: PHI Quantera SXM manufactured by ULVAC-PHI, Inc.

X-ray source used: Al-mono (1486.6 eV), 20 kV/100 W

Analysis area: 100 μmφ

Photoelectron take-off angle: 45°

Neutralization condition: neutralization with electrons and floating ions

Measurement range (eV): 1300 to 0

Step (eV): 1.0

Pass E (eV): 280.0

Measurement time (msec/step): 60

The BET specific surface area is obtained under the following measurement conditions.

Measurement device: Autosorb iQ-MP manufactured by Quantachrome Instruments

Predrying (degassing conditions): in vacuum, 100° C., 1 hour

Adsorption gas: $N_2$

The surface-modified graphite is obtained by subjecting graphite to a fluorine treatment. The fluorine treatment of graphite can be performed with, for example, a dry method or a wet method. In the dry method, graphite is subjected to a fluorine treatment in a gas phase using a gas fluorinating agent. In the wet method, graphite is subjected to a fluorine treatment in a liquid phase using a liquid fluorinating agent. Among these methods, the dry method is preferable from the viewpoints of simple operation, ease of forming a C—F bond group on the graphite surface, and low possibility of doping the inside of the graphite with F.

Examples of the fluorinating agent include fluorine ($F_2$), nitrogen trifluoride, and chlorine trifluoride, and among the fluorinating agents, fluorine ($F_2$) is preferable from the viewpoint of ease of handling. In a case where the fluorine treatment is performed with the dry method, the fluorinating agent may be diluted with a dilution gas such as an inert gas such as a nitrogen gas, a helium gas, a neon gas, an argon gas, or a xenon gas.

Hereinafter, a case will be described in which the graphite is subjected to a fluorine treatment with the dry method.

In a case where the graphite is subjected to a fluorine treatment with the dry method, the graphite is brought into contact with a fluorinating agent gas and thus can be subjected to a fluorine treatment. Examples of the method of bringing graphite into contact with a fluorinating agent gas include a method in which graphite is left in a closed atmosphere of a fluorinating agent gas and brought into contact with the fluorinating agent gas (referred to as batch method), and a method in which graphite is supplied with a fluorinating agent gas and brought into contact with the fluorinating agent gas (flow method).

When brought into contact with a fluorinating agent gas, graphite is preferably heated from the viewpoint of, for example, enhancing the fluorine treatment efficiency. The heating temperature is, for example, preferably 200° C. or higher and 500° C. or lower, and more preferably 300° C. or higher and 400° C. or lower.

The longer the time during which the graphite is brought into contact with the fluorinating agent gas is, the higher the peak intensity $I_{688\ eV}$ derived from a C—F bond is. Therefore, the time during which the graphite is brought into contact with the fluorinating agent gas is to be set to a time such that the peak intensity $I_{688\ eV}$/peak intensity $I_{284\ eV}$ value falls within the range of 0.1 or more and 7 or less. As the time during which the graphite is brought into contact with the fluorinating agent gas becomes longer, the BET specific surface area of the surface-modified graphite subjected to the fluorination treatment becomes larger. Therefore, the time during which the graphite is brought into contact with the fluorinating agent gas is also to be set to a time such that the BET specific surface area is not out of the range of 0.5 $m^2/g$ or more and 3.9 $m^2/g$ or less. Note that the fluorination treatment of the graphite increases the BET specific surface area of the surface-modified graphite, and therefore the graphite before the fluorination treatment may have a BET specific surface area of 0.5 $m^2/g$ or less.

In an XPS spectrum obtained by X-ray photoelectron spectroscopy measurement of the surface-modified graphite, it is preferable that no peak is confirmed in the vicinity of 685 eV (for example, in the range of 683.5 eV to 686.5 eV) derived from a Me-F bond (Me: alkali metal, alkaline earth metal). However, the peak derived from a Me-F bond in an XPS spectrum measured by X-ray photoelectron spectroscopy is confirmed for the surface-modified graphite before charge and discharge of the secondary battery. This is because after charge and discharge of the secondary battery, a film having a Me-F bond such as LiF may be formed on the surface of the surface-modified graphite. If surface-modified graphite having no Me-F bond group on its surface is used, for example, an insulator such as LiF is not present on the surface-modified graphite surface at the time of initial charge, so that local non-uniformity of the current density can be suppressed at the time of charge, and thus a further thin and dense film can be formed. Therefore, contact resistance among surface-modified non-graphitizable carbon can be suppressed, and the battery characteristics such as the output characteristics may be improved.

The peak derived from a Me-F bond in an XPS spectrum measured by X-ray photoelectron spectroscopy is measured under the conditions described below.

Measurement device: PHI Quantera SXM manufactured by ULVAC-PHI, Inc.

X-ray source used: Al-mono (1486.6 eV), 20 kV/100 W
Analysis area: 100 μmφ
Photoelectron take-off angle: 45°
Neutralization condition: neutralization with electrons and floating ions
Element for measurement: F1s
Measurement range (eV): 695 to 675
Step (eV): 0.05
Pass E (eV): 55
Measurement time (msec/step): 60

In an X-ray diffraction pattern obtained by X-ray diffraction measurement of the surface-modified graphite, when the peak intensity in the vicinity of a diffraction angle 2θ=41° (for example, from 40° to 42° is represented by $I_{41}$° and the peak intensity in the vicinity of a diffraction angle 2θ=26.5° (for example, from 25.5° to 27.5°; in a case where a shoulder peak is present, the main peak intensity is to be employed) is represented by $I_{26.5}$°, the ratio of the peak intensity $I_{41}$° to the peak intensity $I_{26.5}$° (hereinafter, peak intensity $I_{41}$°/peak intensity $I_{26.5}$° value) is preferably 0.01 or less. The peak in the vicinity of a diffraction angle 2θ=41° is a peak derived from graphite fluoride ($(CF)_n$), and the peak in the vicinity of a diffraction angle 2θ=26.5° is a peak derived from the (002) plane of graphite. A smaller peak intensity $I_{41}$°/peak intensity $I_{26.5}$° value indicates absence of fluorine atoms inside the graphite. The surface-modified graphite having a peak intensity $I_{41}$°/peak intensity $I_{26.5}$° value of 0.01 or less has a C—F bond group on the surface, but has almost no fluorine atom or no fluorine atom inside. Therefore, formation of an irreversible site that traps lithium ions is suppressed inside the graphite, and the current density (discharge current density) resulting from release of Li+ in the secondary battery may be improved. In order to dispose many fluorine atoms on the surface of the surface-modified graphite, the fluorine treatment is preferably performed with the above-described dry method.

In an X-ray diffraction pattern obtained by X-ray diffraction measurement of the surface-modified graphite, when the peak intensity in the vicinity of a diffraction angle 2θ=26.5° (for example, from 25.5° to 27.5°; in a case where a shoulder peak is present, the main peak intensity is to be employed) is represented by $I_{26.5}$° and the peak intensity in the vicinity of a diffraction angle 2θ=77.5° (for example, from 76.5° to 78.5°; in a case where a shoulder peak is present, the main peak intensity is to be employed) is represented by $I_{77.5}$°, the ratio of the peak intensity $I_{26.5}$° to the peak intensity $I_{77.5}$° (hereinafter, peak intensity $I_{26.5}$°/$I_{77.5}$° value) is preferably 30 or more and 100 or less, and more preferably 40 or more and 80 or less. The peak intensity in the vicinity of a diffraction angle 2θ=26.5° is the intensity of a peak derived from the (002) plane of graphite, and the peak in the vicinity of a diffraction angle 2θ=77.5° is a peak derived from the (110) plane of graphite. The peak intensity $I_{26.5}$°/$I_{77.5}$° value is an index of the crystal orientation of graphite. If the peak intensity $I_{26.5}$°/$I_{77.5}$° value satisfies the above range, the hardness of the surface-modified graphite can be enhanced. As a result, for example, when the negative electrode active material layer is compressed to a predetermined packing density, change in the shape of graphite is suppressed, so that generation of a new surface without the fluorine treatment is suppressed, and the effect of the fluorine treatment may be further obtained.

In an X-ray diffraction pattern obtained by X-ray diffraction measurement of the surface-modified graphite, when the peak intensity in the vicinity of a diffraction angle 2θ=44.5° (for example, from 43.5° to 46.0°) is represented by $I_{44.5}$° and the peak intensity in the vicinity of a diffraction angle 2θ=42.5° (for example, from 41.5° to 43.5°) is represented by $I_{42.5}$°, the ratio of the peak intensity $I_{44.5}$° to the peak intensity $I_{42.5}$ (hereinafter, peak intensity $I_{44.5}$°/$I_{42.5}$° value) is preferably 1 or more and 2 or less. The peak in the vicinity of a diffraction angle 2θ=42.5° is a peak derived from the (100) plane of graphite, and the peak in the vicinity of a diffraction angle 2θ=44.5° is a peak derived from the (101) plane of graphite. The peak intensity $I_{44.5}$°/$I_{42.5}$° value is an index of the graphitization degree of graphite. If the peak intensity $I_{44.5}$°/$I_{42.5}$° value satisfies the above range, a moderately unstable site (for example, dangling bond) is formed on the graphite surface, and a C—F bond group can be formed on the graphite surface under further mild fluorine treatment conditions. As a result, for example, an increase in the BET specific surface area of graphite due to the fluorine treatment can be suppressed, and an increase in irreversible sites that trap lithium ions may be suppressed.

In the surface-modified graphite, the average lattice spacing (d002) of the (002) plane obtained by X-ray diffraction measurement is preferably in the range of 0.3354 nm or more and 0.3380 nm or less, and the (002) plane preferably has a lattice constant a in the range of 0.2459 nm or more and 0.2464 nm or less, and preferably has a lattice constant c in the range of 0.6713 nm or more and 0.6730 nm or less.

The X-ray diffraction measurement is performed under the conditions described below.

Measurement device: X'PertPRO manufactured by PANalytical
Target/monochrome: Cu/C
Sample state: powder
Tube voltage/tube current: 45 kV/40 mA
Scanning mode: continuous
Step width: 0.01°
Scanning speed: 5 s/step
Slit width (DS/SS/RS): 0.5°/none/0.1 mm
Measurement range: 10° to 120°
Measurement temperature: room temperature
Analysis software: HighScore Plus manufactured by PANalytical
Method of calculating lattice constant: calculation using regression analysis from peak position and Miller indices calculated by local profile fitting analysis The surface-modified graphite preferably has a work function obtained with an atmospheric photoelectron yield spectrometer in the range of 5.0 eV or more and 6.0 eV or less. If the work function is less than 5.0 eV, the electrochemical reduction catalytic activity at a defect site (electrochemically active site) on the graphite surface is not sufficiently suppressed. As a result, the growth rate of the film that is formed on the graphite surface by reductive decomposition of the aqueous electrolyte liquid cannot be sufficiently restrained, and therefore the denseness of the film that is formed on the surface may deteriorate. Therefore, the current density (discharge current density) resulting from release of Li+ in the secondary battery may deteriorate as compared with the case where the work function satisfies the above range. If the work function is more than 6.0 eV, the Li+ absorption reaction between the graphite layers is less likely to proceed, and the Li+ absorption/release reaction may be inhibited. Therefore, the current density (discharge current density) resulting from release of Li+ in the secondary battery may deteriorate as compared with the case where the work function satisfies the above range.

The work function is measured using an atmospheric photoelectron yield spectrometer under the conditions described below.

Measurement device: AC-5 manufactured by RIKEN KEIKI Co., Ltd.
Sample state: powder
Light quantity: 100 nW
Photoelectron measurement energy scanning range: 4.2 to 6.2 eV
Light quantity measurement energy scanning range: 4.2 to 6.2 eV
Step width: 0.1 eV
Measurement atmosphere: atmosphere in the air
Measurement temperature: room temperature When the percentage of fluorine present on the surface of the surface-modified graphite is represented by X atom % and the percentage of fluorine present in the whole of the surface-modified graphite is represented by Y atom %, the value of X atom %/Y atom % is preferably 3 or more and 40 or less. If the value of X atom %/Y atom % is less than 3, the surface-modified graphite has C—F bond groups on its surface in such a small absolute amount that the denseness of the film formed on the surface may deteriorate, or the surface-modified graphite has F atoms inside in such a large amount that the number of irreversible sites that trap lithium ions inside the surface-modified graphite may increase, and therefore the current density (discharge current density) resulting from release of Li+ in the secondary battery may deteriorate as compared with the case where the value of X atom %/Y atom % satisfies the above range. If the value of X atom %/Y atom % is more than 40, the surface-modified graphite has C—F bond groups on its surface in such a large absolute amount that the number of irreversible sites that trap lithium ions on the surface may increase, and therefore the current density (discharge current density) resulting from release of Li+ in the secondary battery may deteriorate as compared with the case where the value of X atom %/Y atom % satisfies the above range. In order to increase the amount of fluorine present on the surface of the surface-modified graphite, the fluorine treatment is preferably performed with the above-described dry method.

The percentage of fluorine on the surface of the surface-modified non-graphitizable carbon (A atom %) is a value calculated by X-ray photoelectron spectroscopy measurement. Specifically, the amount of fluorine (atom %), the amount of carbon (atom %), and the amount of oxygen (atom %) are determined by X-ray photoelectron spectroscopy measurement, the percentage of fluorine is calculated based on the total amount thereof that is regarded as 100, and the resulting value is regarded as the percentage of fluorine on the surface of the surface-modified non-graphitizable carbon (A atom %). The percentage of fluorine in the whole of the surface-modified non-graphitizable carbon (B atom %) is a value calculated using the following elemental analyzer. The percentage of fluorine (wt %) in the whole of the surface-modified non-graphitizable carbon is determined with an organic elemental analysis system (XS-2100H manufactured by Mitsubishi Chemical Analytech Co., Ltd.), and then the percentage of carbon (wt %) in the whole of the surface-modified non-graphitizable carbon is determined with an elemental analyzer (JM11 manufactured by J-Science Lab Co., Ltd.). The total of the amount of fluorine (wt %), the amount of carbon (wt %), and the amount of oxygen (wt %) in the whole of the surface-modified non-graphitizable carbon is regarded as 100, and the percentage of fluorine (wt %) and the percentage of carbon (wt %) described above are subtracted to determine the percentage of oxygen (wt %) in the whole of the surface-modified non-graphitizable carbon. The percentage of fluorine (wt %) is converted into the percentage of fluorine (atom %), and the resulting value is regarded as the percentage of fluorine in the whole of the surface-modified non-graphitizable carbon (B atom %).

The surface-modified graphite preferably has an average particle size (D50) of, for example, 5 μm or more and 30 μm or less. If the average particle size (D50) of the surface-modified graphite satisfies the above range, the packing density of the negative electrode is improved as compared with the case where the average particle size (D) does not satisfy the above range, and good battery characteristics may be obtained. The average particle size (D50) means the volume average particle size at which the volume integrated value is 50% in a particle size distribution obtained by a laser diffraction scattering method.

Examples of the graphite to be subjected to the fluorination treatment include natural graphite such as flake graphite, massive graphite, and amorphous graphite, and artificial graphite such as massive artificial graphite (MAG) and a spherocrystal graphitized substance of mesophase spherule (MCMB). Among them, the spherocrystal graphitized substance of mesophase spherule is spherocrystal graphite in which the edge surface is oriented to the surface, and therefore the spherocrystal graphitized substance of mesophase spherule is preferable from the viewpoints of high particle hardness, presence of a moderately unstable site on the graphite surface, and the like. The graphite may be used singly or in combination of two or more.

The negative electrode active material may include materials usable in negative electrode active materials of conventional lithium-ion secondary batteries in addition to the surface-modified graphite as long as an effect of the present disclosure is not impaired, and examples of the materials include alloys including a lithium element, metal compounds, such as metal oxides, metal sulfides, and metal nitrides, including a lithium element, and silicon. Examples of the alloys including a lithium element include a lithium-aluminum alloy, a lithium-tin alloy, a lithium-lead alloy, and a lithium-silicon alloy. Examples of the metal oxides including a lithium element include lithium titanate (such as $Li_4Ti_5O_{12}$). Examples of the metal nitrides including a lithium element include lithium-cobalt nitrides, lithium-iron nitrides, and lithium-manganese nitrides. Sulfur-based compounds may also be exemplified.

The separator 24 is not particularly limited as long as it has functions of lithium-ion permeation and electrical separation between the positive electrode and the negative electrode, and for example, a porous sheet including a resin, an inorganic material, or the like is used. Specific examples of the porous sheet include fine porous thin films, woven fabrics, and nonwoven fabrics. Examples of the material of the separator 24 include olefin-based resins such as polyethylene and polypropylene, polyamides, polyamideimides, and cellulose. Examples of the inorganic material constituting the separator 24 include glass and ceramics such as borosilicate glass, silica, alumina, and titania. The separator 24 may be a stacked body having a cellulose fiber layer and a thermoplastic resin fiber layer such as an olefin-based resin. The separator 24 may be a multilayer separator including a polyethylene layer and a polypropylene layer, and a separator may be used that has a surface to which a material such as an aramid-based resin or a ceramic is applied.

EXAMPLES

Hereinafter, the present disclosure will be further described with reference to Examples, but the present disclosure is not limited to these Examples.

Example 1

Negative Electrode

Surface-modified graphite was prepared by subjecting graphite A to a fluorine treatment. Specifically, first, the graphite A was put into a Ni crucible, the Ni crucible was put in a heating furnace, and a $N_2$ gas (flow rate: 2.7 L/min) was supplied into the heating furnace for 1.5 hours. Thereafter, while the supply of a $N_2$ gas was continued, the temperature in the heating furnace was raised to 300° C. over 3.5 hours. Next, the temperature in the heating furnace was maintained at 300° C., and a mixed gas obtained by mixing a $F_2$ gas (1.9 mol/h) with a $N_2$ gas (flow rate: 2.0 L/min) was supplied into the heating furnace for 2 minutes. Thereafter, the heating in the heating furnace was stopped, and a $N_2$ gas (flow rate: 2.7 L/min) was supplied into the heating furnace to allow the heating furnace to cool, and thus surface-modified graphite was obtained. The obtained surface-modified graphite was measured to determine its physical property values. Table 1 summarizes the results.

The surface-modified graphite (negative electrode active material) and PVDF as a binder were mixed at a solid-content mass ratio of 96:4 in N-methyl-2-pyrrolidone (NMP) to prepare a negative electrode mixture slurry. Next, this negative electrode mixture slurry was applied to a negative electrode current collector made of a copper foil, and the applied film was dried and then rolled with a roller. The resulting product was cut into a predetermined electrode size to obtain a negative electrode. The amount of the applied negative electrode mixture slurry was 32.3 g/m$^2$, and the packing density of the negative electrode active material layer was 1.0 gcm$^{-3}$.

Positive Electrode $LiCoO_2$ as a positive electrode active material, carbon black as a conductive agent, and PVdF as a binder were mixed at a mass ratio of 94:3:3 in NMP to prepare a positive electrode mixture slurry. Next, this positive electrode mixture slurry was applied to a positive electrode current collector made of a Ti foil, and the applied film was dried and then rolled with a roller. The resulting product was cut into a predetermined electrode size to obtain a positive electrode. The amount of the applied positive electrode mixture slurry was 65.0 g/cm$^2$, and the packing density of the positive electrode active material layer was 2.8 gcm$^{-3}$.

Aqueous Electrolyte Liquid

LITFSI, LIBETI, water, and fluoroethylene carbonate (FEC) were mixed at a molar ratio of 1.0:0.42:1.23:2.60 to prepare an aqueous electrolyte liquid having a water volume ratio in the solvent of 10%.

Test Cell

A three-electrode cell (test cell) containing the electrolyte liquid was constructed using the negative electrode as a working electrode, the positive electrode as a counter electrode, and Ag/AgCl (3M NaCl) as a reference electrode.

Example 2

Surface-modified graphite was prepared in the same manner as in Example 1 except that in the preparation of the surface-modified graphite, the mixed gas of a $N_2$ gas and a $F_2$ gas was supplied into the heating furnace for 10 minutes. The obtained surface-modified graphite was measured to determine its physical property values. Table 1 summarizes the results. Then, a test cell was constructed in the same manner as in Example 1 except that this surface-modified graphite was used as the negative electrode active material.

Example 3

Surface-modified graphite was prepared in the same manner as in Example 1 except that in the preparation of the surface-modified graphite, the temperature in the heating furnace was raised to 400° C. over 4.5 hours, the temperature in the heating furnace was maintained at 400° C., and the mixed gas of a $N_2$ gas and a $F_2$ gas was supplied into the heating furnace for 2 minutes. The obtained surface-modified graphite was measured to determine its physical property values. Table 1 summarizes the results. Then, a test cell was constructed in the same manner as in Example 1 except that this surface-modified graphite was used as the negative electrode active material.

Example 4

Surface-modified graphite was prepared in the same manner as in Example 3 except that in the preparation of the surface-modified graphite, the mixed gas of a $N_2$ gas and a $F_2$ gas was supplied into the heating furnace for 10 minutes. The obtained surface-modified graphite was measured to determine its physical property values. Table 1 summarizes the results. Then, a test cell was constructed in the same manner as in Example 1 except that this surface-modified graphite was used as the negative electrode active material.

Comparative Example 1

Graphite A not subjected to a fluorination treatment was used as the negative electrode active material. The graphite A was measured to determine its physical property values. Table 1 summarizes the results. A test cell was constructed in the same manner as in Example 1 using this graphite A as the negative electrode active material.

Comparative Example 2

Surface-modified graphite was prepared in the same manner as in Example 1 except that in the preparation of the surface-modified graphite, graphite B was used. The obtained surface-modified graphite was measured to determine its physical property values. Table 1 summarizes the results. Then, a test cell was constructed in the same manner as in Example 1 except that this surface-modified graphite was used as the negative electrode active material.

Comparative Example 3

Surface-modified graphite was prepared in the same manner as in Example 2 except that in the preparation of the surface-modified graphite, graphite B was used. The obtained surface-modified graphite was measured to determine its physical property values. Table 1 summarizes the results. Then, a test cell was constructed in the same manner as in Example 1 except that this surface-modified graphite was used as the negative electrode active material.

Comparative Example 4

Surface-modified graphite was prepared in the same manner as in Example 3 except that in the preparation of the surface-modified graphite, graphite B was used. The obtained surface-modified graphite was measured to determine its physical property values. Table 1 summarizes the results. Then, a test cell was constructed in the same manner as in Example 1 except that this surface-modified graphite was used as the negative electrode active material.

Comparative Example 5

Surface-modified graphite was prepared in the same manner as in Example 4 except that in the preparation of the surface-modified graphite, graphite B was used. The obtained surface-modified graphite was measured to determine its physical property values. Table 1 summarizes the results. Then, a test cell was constructed in the same manner as in Example 1 except that this surface-modified graphite was used as the negative electrode active material.

Comparative Example 6

Graphite B not subjected to a fluorination treatment was used as the negative electrode active material. The graphite B was measured to determine its physical property values. Table 1 summarizes the results. A test cell was constructed in the same manner as in Example 1 using this graphite B as the negative electrode active material.

Cyclic voltammetry measurement was performed using the test cells of Examples 1 to 4 and Comparative Examples 1 to 6, and the current density at the oxidation peak in the second cycle was evaluated. The measurement conditions are shown below.

Start potential: OCV

First switching potential: −2.950 V vs. Ag/AgCl (3 M NaCl)

(0.288 V with respect to Li)

Second switching potential: −0.238 V vs. Ag/AgCl (3 M NaCl)

(3 V with respect to Li)

Number of cycles: 2 cycles

Sweep rate: 0.5 mV/sec

Measurement temperature: 25° C.

Table 1 summarizes the amount of increase in the current density at the oxidation peak in the second cycle in each of Examples 1 to 4 with respect to the current density at the oxidation peak in the second cycle in Comparative Example 1 in which the graphite A is not subjected to a fluorine treatment, and also summarizes the amount of increase in the current density at the oxidation peak in the second cycle in each of Comparative Examples 2 to 5 with respect to the current density at the oxidation peak in the second cycle in Comparative Example 6 in which the graphite B is not subjected to a fluorine treatment. In Table 1, levels at which no oxidation peak appeared are described as "–".

TABLE 1

| | Surface-modified graphite | | | | | | | | | | Current density Amount of increase with respect to Comparative Example 1 using graphite A not subjected to fluorine treatment or Comparative Example 6 using graphite B not subjected to fluorine treatment |
|---|---|---|---|---|---|---|---|---|---|---|---|
| | Graphite | $I_{688eV}/I_{284eV}$ | d002 (nm) | Lattice constant a (nm) | Lattice constant c (nm) | $I_{44.5°}/I_{42.5°}$ | $I_{26.5°}/I_{77.5°}$ | BET specific surface area ($m^2/g$) | D50 (μm) | Work function (eV) | ($mA/cm^2$) |
| Example 1 | Graphite A | 0.49 | 0.33684 | 0.2461 | 0.6718 | 1.84 | 60.6 | 1.205 | 24.0 | 5.19 | 0.0022 |
| Example 2 | Graphite A | 1.83 | 0.33675 | 0.2461 | 0.6719 | 1.84 | 54.6 | 1.469 | 24.0 | 5.52 | 0.0040 |
| Example 3 | Graphite A | 1.37 | 0.33704 | 0.2461 | 0.6718 | 1.80 | 53.0 | 1.279 | 24.0 | 5.39 | 0.0029 |
| Example 4 | Graphite A | 2.80 | 0.33628 | 0.2461 | 0.6718 | 1.85 | 60.5 | 1.660 | 24.0 | 5.47 | 0.0068 |
| Comparative Example 1 | Graphite A | 0 | 0.33637 | 0.2462 | 0.6711 | 1.64 | 60.5 | 1.165 | 22.3 | 4.93 | — |
| Comparative Example 2 | Graphite B | 0.25 | 0.33553 | 0.2461 | 0.6712 | 2.54 | 158.5 | 4.138 | 22.3 | 4.99 | — |
| Comparative Example 3 | Graphite B | 0.76 | 0.33650 | 0.2461 | 0.6712 | 2.31 | 112.0 | 4.480 | 22.3 | 5.40 | — |
| Comparative Example 4 | Graphite B | 0.45 | 0.33655 | 0.2461 | 0.6711 | 2.07 | 106.9 | 4.219 | 22.3 | 5.14 | — |
| Comparative Example 5 | Graphite B | 1.34 | 0.33573 | 0.2461 | 0.6712 | 2.27 | 133.8 | 5.513 | 22.3 | 5.37 | — |
| Comparative Example 6 | Graphite B | 0 | 0.33645 | 0.2462 | 0.6710 | 2.14 | 106.1 | 4.100 | 22.3 | 4.86 | — |

As can be seen from Table 1, in Examples 1 to 4 in which the surface-modified graphite was used that had an $I_{688\ eV}/I_{284\ eV}$ value of 0.1 or more and 7 or less and satisfied the range of the BET specific surface area of 0.5 $m^2/g$ or more and 3.9 $m^2/g$ or less, the current density at the oxidation peak was increased as compared with Comparative Example 1 in which at least one of the $I_{688\ eV}/I_{284}$ eV value or the BET specific surface area did not satisfy the above range. In Comparative Examples 1 to 6, a clear oxidation peak was not confirmed.

Among Examples 1 to 4, Examples 2 and 4 were particularly preferable in which the surface-modified graphite was used that had a ($I_{688}$ eV/$I_{284}$ eV)/(BET specific surface area) ratio in the range of 1.15 to 1.8, from the viewpoint of increasing the current density at the oxidation peak.

Example 5

A test cell was constructed in the same manner as in Example 2 except that in the preparation of the aqueous electrolyte liquid, LITFSI, LIBETI, and water were mixed at a molar ratio of 0.7:0.3:2.0 to prepare an aqueous electrolyte liquid having a water volume ratio in the solvent of 100%.

Example 6

A test cell was constructed in the same manner as in Example 4 except that the aqueous electrolyte liquid of Example 5 was used.

Comparative Example 7

A test cell was constructed in the same manner as in Comparative Example 1 except that the aqueous electrolyte liquid of Example 5 was used.

Comparative Example 8

A test cell was constructed in the same manner as in Comparative Example 3 except that the aqueous electrolyte liquid of Example 5 was used.

Comparative Example 9

A test cell was constructed in the same manner as in Comparative Example 5 except that the aqueous electrolyte liquid of Example 5 was used.

Comparative Example 10

A test cell was constructed in the same manner as in Comparative Example 6 except that the aqueous electrolyte liquid of Example 5 was used.

In the same manner as described above, cyclic voltammetry measurement was performed using the test cells of Examples 5 to 6 and Comparative Examples 7 to 10, and the current density at the oxidation peak in the first cycle was evaluated. Table 2 summarizes the amount of increase in the current density at the oxidation peak in the first cycle in each of Examples 5 to 6 with respect to the current density at the oxidation peak in the first cycle in Comparative Example 7 in which the graphite A is not subjected to a fluorine treatment, and also summarizes the amount of increase in the current density at the oxidation peak in the first cycle in each of Comparative Examples 8 to 9 with respect to the current density at the oxidation peak in the first cycle in Comparative Example 10 in which the graphite B is not subjected to a fluorine treatment. Levels at which no oxidation peak appeared are described as "–".

TABLE 2

| | Surface-modified graphite | | | | | | | | | | Current density Amount of increase with respect to Comparative Example 7 using graphite A not subjected to fluorine treatment or Comparative Example 10 using graphite B not subjected to fluorine treatment (mA/cm²) |
|---|---|---|---|---|---|---|---|---|---|---|---|
| | Graphite | $I_{688eV}/I_{284eV}$ | d002 (nm) | Lattice constant a (nm) | Lattice constant c (nm) | $I_{44.5°}/I_{42.5°}$ | $I_{26.5°}/I_{77.5°}$ | BET specific surface area ($m^2/g$) | D50 (μm) | Work function (eV) | |
| Example 5 | Graphite A | 1.83 | 0.33675 | 0.2461 | 0.6719 | 1.84 | 54.6 | 1.469 | 24.0 | 5.52 | 0.1367 |
| Example 6 | Graphite A | 2.80 | 0.33628 | 0.2461 | 0.6718 | 1.85 | 60.5 | 1.660 | 24.0 | 5.47 | 0.2142 |
| Comparative Example 7 | Graphite A | 0 | 0.33637 | 0.2462 | 0.6711 | 1.64 | 60.5 | 1.165 | 22.3 | 4.93 | — |
| Comparative Example 8 | Graphite B | 0.76 | 0.33650 | 0.2461 | 0.6712 | 2.31 | 112.0 | 4.480 | 22.3 | 5.40 | — |
| Comparative Example 9 | Graphite B | 1.34 | 0.33573 | 0.2461 | 0.6712 | 2.27 | 133.8 | 5.513 | 22.3 | 5.37 | — |
| Comparative Example 10 | Graphite B | 0 | 0.33645 | 0.2462 | 0.6710 | 2.14 | 106.1 | 4.100 | 22.3 | 4.86 | — |

As can be seen from Table 2, even in Examples 5 to 6 in which the aqueous electrolyte liquid was used that had a water volume ratio in the solvent of 100%, the current density at the oxidation peak was increased as compared with Comparative Example 7.

REFERENCE SIGNS LIST

20 Secondary battery
21 Battery case
22 Positive electrode
23 Negative electrode
24 Separator
25 Gasket
26 Sealing plate
27 Electrolyte liquid

The invention claimed is:

1. An aqueous secondary battery comprising:
a negative electrode;
a positive electrode; and
an aqueous electrolyte liquid containing water and a lithium salt, wherein the negative electrode comprises a negative electrode active material comprising graphite,
the graphite having a surface having a C—F bond group,
the graphite having a ratio of a peak intensity $I_{688\ eV}$ to a peak intensity $I_{284eV}$ as an $I_{688\ eV}/I_{284\ eV}$ value of 2.80 or more and 7 or less in an X-ray photoelectron spectroscopy (XPS) spectrum obtained by XPS measurement wherein the peak intensity $I_{688\ eV}$ represents a peak intensity in a vicinity of 688 eV derived from a C—F bond, and the peak intensity $I_{284\ eV}$ represents a peak intensity in a vicinity of 284 eV derived from a C—C bond,
the graphite having a BET specific surface area of 0.5 $m^2/g$ or more and 3.9 $m^2/g$ or less,
wherein the aqueous electrolyte liquid contains an organic carbonate, wherein the organic carbonate consists of a cyclic organic carbonate, and
wherein a content of the organic carbonate with respect to the lithium salt in the aqueous electrolyte liquid is such that a molar ratio of the lithium salt to the organic carbonate is in a range of 1:0.01 to 1:2.

2. The negative electrode active material for the aqueous secondary battery according to claim 1, wherein the graphite has a ratio of a peak intensity $I_{41°}$ to a peak intensity $I_{26.5°}$ as an $I_{41°}/I_{26.5°}$ value of 0.01 or less in an X-ray diffraction pattern obtained by X-ray diffraction measurement wherein the peak intensity $I_{41°}$ represents a peak intensity in a vicinity of a diffraction angle 2θ=41° and the peak intensity $I_{26.5°}$ represents a peak intensity in a vicinity of a diffraction angle 2θ=26.5°.

3. The negative electrode active material for the aqueous secondary battery according to claim 1, wherein the graphite has a ratio of X atom %/Y atom % of 3 or more and 40 or less wherein X atom % represents a percentage of fluorine present on the surface of the graphite and Y atom % represents a percentage of fluorine present in a whole of the graphite.

4. The negative electrode active material for the aqueous secondary battery according to claim 1, wherein the graphite has an average particle size (D50) of 5 μm or more and 30 μm or less.

5. The negative electrode active material for the aqueous secondary battery according to claim 1, wherein the graphite has a ratio of a peak intensity $I_{26.5°}$ to a peak intensity $I_{77.5°}$ as an $I_{26.5°}/I_{77.5°}$ value of 30 or more and 100 or less in an X-ray diffraction pattern obtained by X-ray diffraction measurement wherein the peak intensity $I_{26.5°}$ represents a peak intensity in a vicinity of a diffraction angle 2θ=26.5° and the peak intensity $I_{77.5°}$ represents a peak intensity in a vicinity of a diffraction angle 2θ=77.5°.

6. The negative electrode active material for the aqueous secondary battery according to claim 1, wherein the graphite has a ratio of a peak intensity $I_{44.5°}$ to a peak intensity $I_{42.5°}$ as an $I_{44.5°}/I_{42.5°}$ value of 1 or more and 2 or less in an X-ray diffraction pattern obtained by X-ray diffraction measurement wherein the peak intensity $I_{44.5°}$ represents a peak intensity in a vicinity of a diffraction angle 2θ=44.5° and the peak intensity $I_{42.5°}$ represents a peak intensity in a vicinity of a diffraction angle 2θ=42.5°.

7. The negative electrode active material for the aqueous secondary battery according to claim 1, wherein the graphite is a spherocrystal graphitized substance of mesophase spherule.

8. The aqueous secondary battery according to claim 1, wherein the lithium salt includes a salt having a lithium ion and an imide anion.

9. The aqueous secondary battery according to claim 8, wherein the lithium salt includes lithium bis(trifluoromethanesulfonyl)imide.

10. The aqueous secondary battery according to claim 1, wherein a content of the water with respect to the lithium salt in the aqueous electrolyte liquid is such that a molar ratio of the lithium salt to the water is 1:4 or less.

11. The aqueous secondary battery according to claim 1, wherein the content of the water with respect to the lithium salt in the aqueous electrolyte liquid is such that the molar ratio of the lithium salt to the water is in a range of 1:0.4 to 1:4.

12. The aqueous secondary battery according to claim 1, wherein the cyclic organic carbonate includes fluorine as a constitution element.

13. The aqueous secondary battery according to claim 12, wherein the cyclic organic carbonate includes fluoroethylene carbonate.

* * * * *